United States Patent [19]

Koitabashi

[11] Patent Number: 4,669,295

[45] Date of Patent: Jun. 2, 1987

[54] METHOD OF MANUFACTURING A MAGNETIC ROTATABLE MEMBER FOR AN ELECTROMAGNETIC CLUTCH

[75] Inventor: Takatoshi Koitabashi, Annaka, Japan

[73] Assignee: Sanden Corporation, Gunma, Japan

[21] Appl. No.: 814,790

[22] Filed: Dec. 30, 1985

Related U.S. Application Data

[62] Division of Ser. No. 661,465, Oct. 16, 1984.

[51] Int. Cl.[4] .......................... B21D 53/00; B21D 53/26

[52] U.S. Cl. .......................................... 72/340; 72/348; 29/159 R; 29/602 R; 192/12 D; 192/84 C

[58] Field of Search ................. 72/324, 340, 379, 348; 29/159 R, 602 R; 192/84 C, 12 D, 17 C, 18 B; 188/161

[56] References Cited

U.S. PATENT DOCUMENTS

| | | | |
|---|---|---|---|
| 3,672,042 | 6/1972 | Jaeschke | 192/12 D |
| 4,314,472 | 2/1982 | Saegusa et al. | 72/340 |
| 4,445,606 | 5/1984 | Van Laningham | 192/84 C |
| 4,526,257 | 7/1985 | Mueller | 192/84 C |

FOREIGN PATENT DOCUMENTS

| | | | |
|---|---|---|---|
| 166283 | 7/1950 | Austria | 72/340 |
| 579240 | 7/1959 | Canada | 29/602 |
| 148434 | 11/1981 | Japan | 29/159 R |
| 103970 | 6/1982 | Japan | 192/84 C |
| 110441 | 6/1984 | Japan | 29/159 R |

OTHER PUBLICATIONS

Jones, Franklin D., *Die Design and Diemaking Practice,* The Industrial Press, London, Second Ed., 1941, pp. 582-585.

*Primary Examiner*—Daniel C. Crane

*Attorney, Agent, or Firm*—Banner, Birch, McKie & Beckett

[57] ABSTRACT

An electromagnetic clutch includes a first rotatable member of magnetic material having an axial end surface and a hollow portion in which an annular electromagnetic device is disposed in a stationary position. A second rotatable member, such as a drive shaft, is provided within the first rotatable member. A hub is secured on the second rotatable member and a magnetic armature plate is supported on and around the hub. The magnetic armature plate, which faces the axial end surface of the first rotatable member at a predetermined axial air gap, is capable of limited axial movement and is attracted to the first rotatable member when the electromagnetic device is energized to frictionally engage the first rotatable member. In particular, in the electromagnetic clutch of this invention, the first rotatable member includes an outer cylindrical member, an inner cylindrical member and an axial end plate member which has an axial end surface connected therebetween, with the outer diameter of the axial end plate member exceeding the diameter of the outer cylindrical member and the inner diameter being smaller than the diameter of the inner cylindrical member.

1 Claim, 9 Drawing Figures

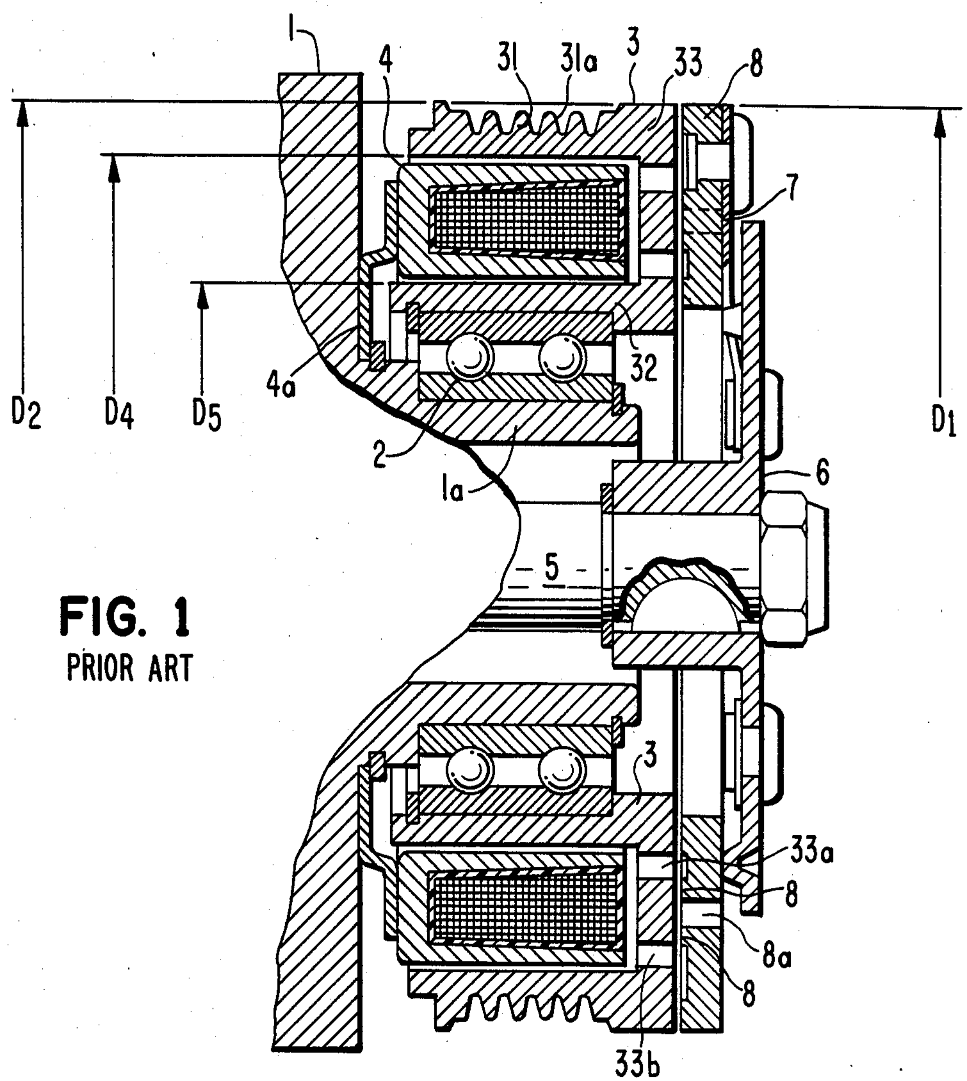
FIG. 1
PRIOR ART
FIG. 2a
PRIOR ART
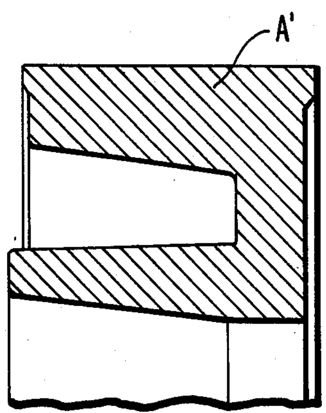
FIG. 2b
PRIOR ART
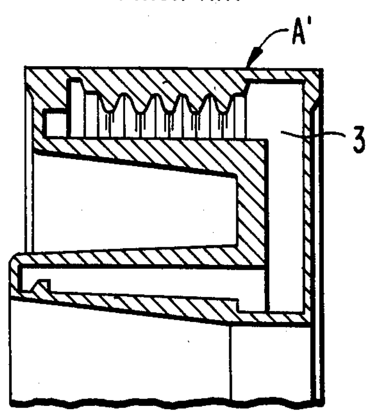

1
4
41
301
301a
42
304
300
305
8
Ø
303
40
306
302
2
1a
5
D6
D3
D8
D7
2
306
303a
302
8a
81
8b
301
301a
305
303b

METHOD OF MANUFACTURING A MAGNETIC ROTATABLE MEMBER FOR AN ELECTROMAGNETIC CLUTCH

This application is a division of application Ser. No. 661,465, filed Oct. 16, 1984.

BACKGROUND OF THE INVENTION

This invention generally relates to electromagnetic clutches and, more paticularly, to an improved magnetic rotatable member for an electromagnetic clutch.

Electromagnetic clutches generally are mounted on a device having a drive shaft to selectively drive the device from an external power source. A conventional electromagnetic clutch is described, for example, in U.S. Pat. Nos. 3,044,594 and 3,082,933. Such a conventional electromagnetic clutch is shown in FIG. 1 and includes magnetic pulley 3 rotatably mounted on tubular extension 1*a* of device 1 through bearing 2. Magnetic pulley 3 is rotated by an external power source through a belt (not shown). Annular electromagnetic device 4 is disposed in a stationary position in a hollow portion defined by pulley 3 and is secured on device a through support plate 4*a*. Hub 6 is secured on outer terminal end of drive shaft 5 and armature plate 8 is supported by a plurality of leaf springs 7 on and around hub 6 at a predetermined radial gap. Armature plate 8, which faces the axial end surface of pulley 3 at a predetermined axial gap, is capable of limited axial movement.

In the above described electromagnetic clutch, pulley 3 includes outer cylindrical portion 31 on which belt-receiving groove 31*a* is formed, inner cylindrical portion 32 and axial end plate portion 33 connecting the outer and inner cylindrical portions 31 and 32. Axial end plate portion 33 has a plurality of concentric slits 33*a*, 33*b* which form concentric annular magnetic pole faces at an axial end thereof. Armature plate 8 also is provided with slit 8*a* on the surface opposite the concentric slits of pulley 3.

In this conventional electromagnetic clutch, pulley 3 is formed as a single body of magnetic material, such as steel, by a two-step process including a forging step followed by a machining step. In the forging step, U-shaped annular ring A' is formed as shown in FIG. 2*a*, and in the machining step, ring A' is machined to the accurate diameter of pulley 3, i.e., the oblique line portion shown in FIG. 2*b* is cut by machine. Concentric slits 33*a*, 33*b* then are formed by a press punching step. Thus, as described above, the pulley is formed in several steps, such as the forging and machining steps, which waste much material as evident from a comparison of FIG. 2*a* and FIG. 2*b*. This waste of material increases the cost of the magnetic clutch.

In addition, if it is desired to increase the rotation speed of the pulley, the diameter of pulley 3 should be reduced, which means the distance between inner diameter $D_4$ of outer cylindrical portion 31 and outer diameter $D_5$ of inner cylindrical portion 32 should be reduced. As a result of such a reduction, however, the distance between concentric slits 33*a*, 33*b* is reduced, which in turn reduces the frictional contact surface between the armature plate and the pulley. This has the additional disadvantage of reducing the transmitted torque.

To resolve the above described disadvantage of reduced transmission torque, the frictional contact surface between axial end plate portion 33 and armature plate 8 can be increased. For example, outer diameter $D_2$ of axial end plate portion 33 and outer diameter $D_1$ of armature plate 8 can be increased. However, if these diameters are increased, the amount of wasted material to form the final shape of the pulley is increased, which again increases the cost of the magnetic clutch.

SUMMARY OF THE INVENTION

It is a primary object of this invention to provide an improved electromagnetic clutch having a magnetic rotatable member which can be produced by a simple method to reduce production time and wasted material.

It is another object of this invention to provide an electromagnetic clutch having sufficient frictional surface area to increase transmission torque.

It is still another object of this invention to provide an improved method for producing a magnetic rotatable member for an electromagnetic clutch.

An electromagnetic clutch according to this invention includes a first rotatable member of magnetic material which is rotatably supported on a bearing and has an axial end surface. An annular electromagnetic device is disposed in a stationary position in a hollow portion of the first rotatable member. A second rotatable member, such as a drive shaft, is provided within the first rotatable member. A hub is secured on the second rotatable member and a magnetic armature plate is supported on and around the hub at a radial gap. The magnetic armature plate, which faces the axial end surface of the first rotatable member at a predetermined axial air gap, is capable of limited axial movement. The magnetic armature plate is attracted to the first rotatable member when the electromagnetic device is energized to frictionally engage the first rotatable member. In particular, in the electromagnetic clutch of this invention, the first rotatable member includes an outer cylindrical member, an inner cylindrical member and an axial end plate member which has an axial end surface connected therebetween, with the outer diameter of the axial end plate member exceeding the diameter of the outer cylindrical member and the inner diameter being smaller than the diameter of the inner cylindrical member.

Further objects, features and other aspects of this invention will be understood from the following detailed description of the preferred embodiment of this invention referring to the annexed drawings.

BRIEF DESCRIPTION OF THE DRAWINGS

FIG. 1 is a cross-sectional view of a conventional electromagnetic clutch.

FIG. 2 is a cross-sectional view of a pulley for a conventional electromagnetic clutch for use in illustrating a known production method.

DETAILED DESCRIPTION OF THE PREFERRED EMBODIMENT

Figure 3:
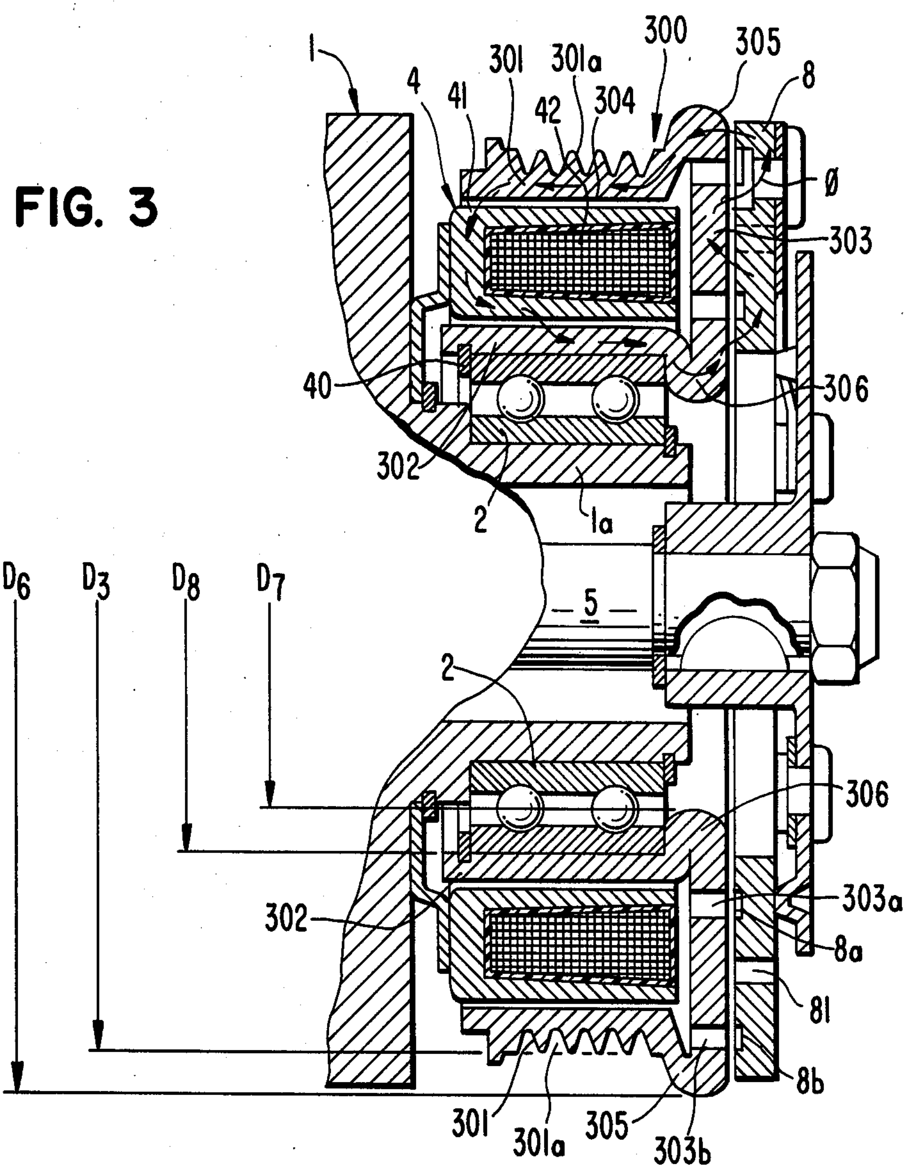
FIG. 3 is a cross-sectional view of an electromagnetic clutch according to one embodiment of this invention.

Referring to FIG. 3, the preferred embodiment of the present invention is similar to the conventional electromagnetic clutch shown in FIG. 1 except for the construction of the pulley. Therefore, similar parts are represented by the same reference characters as in FIG. 1 and the detailed description of the similar parts will be omitted in order to simplify the following description of the preferred embodiment.

In the preferred embodiment of FIG. 3, pulley 300, which is formed as a single body of material, includes outer cylindrical portion 301 having belt-receiving grooves 301*a*, inner cylindrical portion 302 and axial end plate portion 303 at one end surface of both cylindrical portions 301 and 302 for connecting therebetween. Thus, annular hollow portion 304 is defined by portions 301, 302 and 303 and stationary electromagnetic device 4 is placed within hollow portion 304 with a small gap between electromagnetic device 4 and portiosn 301–303. Inner and outer cylindrical portions 301 and 302 are connected to axial end plate portion 303 through step portions 305, 306, respectively. As shown in FIG. 3, inner diameter $D_8$ of inner cylindrical portion 302 is larger than inner diameter $D_7$ of axial end plate portion 303 and outer diameter $D_3$ of outer cylindrical portion 301 is smaller than outer diameter $D_6$ of axial end plate portion 303. In this construction of pulley 300, the inner end of the outer axial end surface of the outer race of bearing 2 is fitted against the inner end surface of step portion 306. Therefore, axial movement of the outer race of bearing 2 is prevented by step portion 306 of pulley 300. Additionally, snap ring 40 is disposed on the inner peripheral surface of inner cylindrical portion 302.

Axial end plate portion 303 of pulley 300 is provided with concentric slits 303*a*, 303*b* to form concentric annular magnetic pole faces at an axial end thereof. A plurality of annular shaped grooves 8*a*, 8*b* are formed on the axial end surface of armature plate 8 opposite axial end plate portion 303 of pulley 300. Annular grooves 8*a*, 8*b* face concentric slits 303*a*, 303*b*. Armature plate 8 also includes slit 81 placed midway between annular shaped grooves 8*a*, 8*b*. As a result, the frictional surface of armature plate 8 is divided into four portions by slits 303*a*, 303*b* and grooves 8*a*, 8*b* so that the magnetic flux zigzags between axial end plate portion 303 of pulley 300 and armature plate 8.

In the above arrangement, when electromagnetic coil 42 is energized, magnetic flux ($\phi$), as shown by broken lines in FIG. 3, is produced and flows through a closed loop including magnetic housing 41 of electromagnetic device 4, outer cylindrical portion 301, step portion 305, armature plate 8, axial end plate portion 303, armature plate 8, step portion 306, inner cylindrical portion 302 and the outer race of bearing 2. Therefore, armature plate 8 is attracted to axial end plate portion 303 of pulley 300 so that drive shaft 5 is rotated together with pulley 300 in a manner similar to conventional electromagnetic clutches. However, in the present invention, the axial end surface of the axial end plate has a large contact surface without increasing the outer diameter of the pulley per se. The large contact surface increases the frictional surface area between pulley 300 and armature plate 8. Also, the outer diameter of outer cylindrical portion 301, on which belt-receiving grooves 301*a* are formed, is smaller than the outer diameter of axial end plate portion 303 so that high rotating speed can be accomplished without reduction of the transmission torque.

When magnetic coil 42 is de-energized, armature plate 8 is separated from pulley 300 and returned to its original position by the recoil strength of leaf springs 7. Thereafter, pulley 300 continues to rotate in response to the output of the external power source, but device 1, which may be a compressor, is not driven.

Figure 4A:
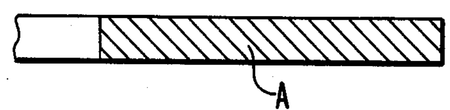
FIGS. 4*a*–4*e* are cross-sectional views of a pulley for use in illustrating the production method of the present invention.
Figure 4B:
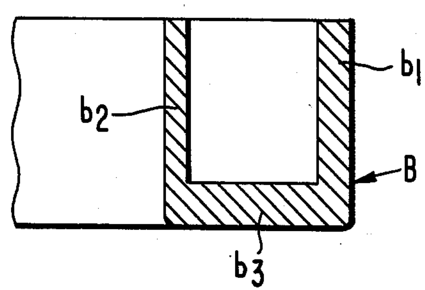
Figure 4C:
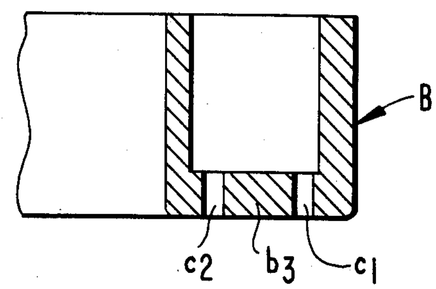

Referring now to FIGS. 4*a*–4*b*, a method for producing a pulley in accordance with the above described electromagnetic clutch will be explained. As shown in FIG. 4*a*, a first magnetic circular plate A of a predetermined dimension with a central opening is prepared. As to the nature of the magnetic material, any magnetic material which can be drawn and pressed can be used. Magnetic circular plate A first is pressed and drawn to form annular blank B having outer annular cylindrical portion $b_1$, inner annular cylindrical portion $b_2$ and axial end annular plate portion $b_3$, as shown in FIG. 4*b*. Concentric slits $C_1$ and $C_2$ are formed on axial end portion $b_3$ as shown in FIG. 4*c* by punching.

Figure 4D:
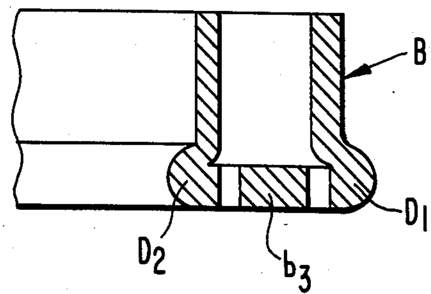
Figure 4E:
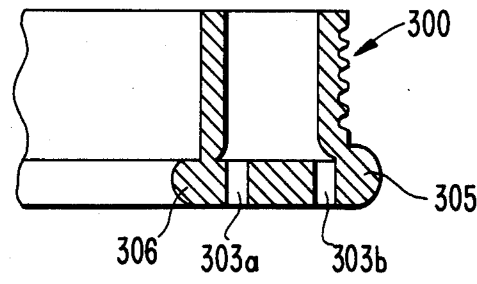

Blank B then is subjected to a reverse drawing or upset working to press outer and inner cylindrical portions bI and b2 so that step portions $D_1$ and $D_2$ are formed on the outer peripheral portion of axial end plate portion $b_3$ as shown in FIG. 4*d*. Blank B also is subjected to a cutting process to cut away an outer peripheral surface of outer cylindrical portion bI to form belt-receiving grooves therein as shown in FIG. 4*e*. Thus, pulley 300 is completed as shown in FIG. 4*e*; this pulley includes outer cylindrical portion 301, inner cylindrical portion 302 and axial end plate portion 303 connecting cylindrical portions 301 and 302 through step portions 305 and 306, respectively.

In the above described method of this invention, since the magnetic pulley is produced by drawing, pressing and cutting, this pulley can be readily produced in less production time and with a high degree of dimensional accuracy. Furthermore, since the amount of cut-away material is quite small, the amount of wasted material is remarkably reduced to thereby reduce cost.

Although an illustrative embodiment of the invention has been described in detail with reference to the accompanying drawings, it is to be understood that the invention is not limited to that precise embodiment and that various changes and modifications may be effected thereby by one skilled in the art without departing from the scope or spirit of the invention.

I claim:

1. A method for producing a magnetic rotatable member for an electromagnetic clutch having a generally U-shaped cross-section which defines an annular hollow portion in which an electromagnetic coil can be disposed, the method comprising the steps of:

forming a magnetic circular plate of predetermined dimension and having a central opening;

pressing and drawing said magnetic circular plate to form an annular blank which has an outer cylindrical portion, an inner cylindrical portion and an axial end plate portion connecting said outer and inner cylindrical portions at their axial ends;

press-punching concentric slits in said axial end plate portion of said annular blank;

reverse drawing said annular blank to form radial flange portions on the outer and inner peripheral surfaces of said axial end plate portion; and cutting away portions of the outer peripheral surface of said outer cylindrical portion to form belt-receiving grooves.

* * * * *